United States Patent [19]
Pitan et al.

[11] 3,902,576
[45] Sept. 2, 1975

[54] ADD-ON UNIDIRECTIONAL BRAKE

[75] Inventors: Roger W. Pitan, Medford; Richard M. Biessener, Faribault, both of Minn.

[73] Assignee: Nutting Truck and Caster Company, Faribault, Minn.

[22] Filed: Nov. 11, 1974

[21] Appl. No.: 522,688

[52] U.S. Cl. ............... 188/82.7; 188/29; 188/1 D; 280/1.182; 104/172 BT; 16/35 R
[51] Int. Cl.$^2$ .......................................... B60T 1/04
[58] Field of Search .......... 188/1 D, 82.7, 82.1, 30, 188/29; 280/1.189, 1.182

[56] References Cited
UNITED STATES PATENTS

| | | | |
|---|---|---|---|
| 1,476,439 | 12/1923 | Boatsman | 188/30 |
| 1,800,587 | 4/1931 | Appleby | 280/1.189 X |
| 2,560,704 | 7/1951 | Sebel | 188/82.7 |
| 2,802,671 | 8/1957 | Skoggard | 280/1.182 |
| 2,911,226 | 11/1959 | Grieder | 280/1.183 |
| 3,358,792 | 12/1967 | Proulx | 188/29 |
| 3,750,593 | 8/1973 | Zetterlund | 104/172 BT |

*Primary Examiner*—Leo Friaglia
*Attorney, Agent, or Firm*—Dorsey, Marquart, Windhorst, West & Halladay

[57] ABSTRACT

A unidirectional brake is provided for addition to a caster of conventional construction having a wheel mounted to an axle for rotation, which axle is mounted in a yoke. The add-on unidirectional brake includes a pair of mounting brackets adapted to be mounted to opposite sides of the caster by means co-operating with the axle. The legs of a U-shaped bail member are mounted to the mounting brackets by hooks at the ends of the legs, which hooks extend inwardly through holes in the mounting brackets. When the brackets are in place and the caster is in an upright position, the legs extend rearwardly from the mounting brackets and the bight rests in contact with the periphery of the caster wheel and the hooks on the ends of the legs of the U-shaped bail member cooperate with the yoke to form stop means to limit movement of the brackets during rearward rotation of the wheel. The unidirectional brake of the present invention has particular application to the front casters of a tow line conveyor truck.

4 Claims, 3 Drawing Figures

PATENTED SEP 2 1975  3,902,576

ADD-ON UNIDIRECTIONAL BRAKE

BACKGROUND OF THE INVENTION

1. Field of the Invention

This invention is related to a brake and, more particularly, to an add-on unidirectional brake which may be added onto a caster used with, for example, a tow line conveyor truck.

2. Description of the Prior Art

Tow line conveyor trucks which are used in warehousing and other operations to move material are well known in the art. In many such installations, the truck rolls on casters and has a tow pin which extends through a slot in the warehouse floor to engage towing means, often disposed beneath the floor, for pulling the truck along a predetermined path. Such towing means commonly have sequentially disposed engaging blocks for engaging the tow pins of the trucks. Such tow line conveyor trucks have also been built with tow pins which automatically retract from engagement with the engaging blocks when the truck meets an obstacle to its forward movement. The usual manner in which the tow pins are retracted is to provide the truck with a front bumper which cooperates with the tow pin to retract the tow pin when the front bumper meets an obstacle, such as a similar truck which has stopped.

When trucks having such automatically retracting tow pins were first used, disengagement from the towing means of the tow pin of the tow line conveyor truck when the truck was on an up-slope resulted in rearward movement of the truck if the tow pin remained retracted. This was undesirable from both a safety standpoint and due to the fact that such rearward movement for a sustained length of time resulted in the truck building up a considerable amount of speed so that when it finally came to rest, damage was done to the articles carried on the truck or to the obstacle which it finally struck. However, permitting the tow pin to drop and re-engage the next engaging block also caused problems. In this case, the truck would have rolled rearwardly after meeting the obstacle, either because it was on an up-slope or because of recoil from the bumper hitting the obstacle. Re-engagement of the tow pin with the next engaging block would merely cause the truck to strike the obstacle again, with the same sequence of events taking place as long as the obstacle remained.

It is known in the prior art to provide the front casters used on such trucks with a unidirectional brake so that if the tow pin is disengaged from the towing means while the truck is on an up-slope, the truck will not roll in a rearward direction. The unidirectional brake will also keep the bumper in contact with the obstacle to keep the tow pin retracted to prevent it from re-engaging the towing means.

One example of such a unidirectional brake is shown in U.S. Pat. No. 3,750,593 to Zetterlund, which shows the front caster wheels provided with one-way roller clutch bearings which enable the front caster wheels to rotate in the forward direction but which prevent rotation in a rearward direction. In the Zetterlund patent, the front casters are specially designed to incorporate the one-way roller clutch bearings on the wheels. Thus, the unidirectional brake dislosed in the Zetterlund patent has application only to caster wheels which were built incorporating the roller clutch bearing disclosed in that patent, and existing tow line conveyor trucks with conventional front caster wheels cannot be readily modified to include such a unidirectional brake. Further, replacement of conventional caster wheels with wheels including Zetterlund's one-way roller clutch bearing would be expensive. In addition, the type of unidirectional brake disclosed in the Zetterlund patent may be subject to failure if a large rearward force is applied to the truck, since the bearing which forms the brake is subject to deformation and the one-way braking action is lost if excessive rearward force is applied to the vehicle.

Another type of unidirectional brake which has been used for casters is shown in U.S. Pat. No. 2,560,704 to Sebel. In the Sebel patent, a caster which has a wheel mounted in a yoke is provided with a U-shaped bail which is pivoted to the yoke at the ends of the arms of the bail, with the bight of the bail resting in contact with the periphery of the caster wheel. As the wheel rotates in a forward direction the bail is inoperative, but if the wheel is rotated in a rearward direction the bail frictionally engages the periphery of the wheel and prevents it from rotating in a rearward direction. The Sebel patent, although not employing as complex a mechanism as the roller clutch bearing shown in the Zetterlund patent, does require the caster to be initially manufactured with the one-way brake and therefore is not adapted for use with an existing caster without modification of the caster structure.

SUMMARY OF THE INVENTION

The present invention enables a tow line conveyor truck having swivel mounted front casters of conventional construction to be easily and quickly equipped with an add-on unidirectional brake to prevent rearward rotation of the caster wheels, while necessitating neither the incorporation of the unidirectional brake into the caster during its manufacture nor modification of the conventional caster onto which the unidirectional brake is added.

It is an object of the present invention to provide an inexpensive and easily installed unidirectional brake which may be quickly added onto a caster of conventional construction.

In accordance with the present invention, an add-on unidirectional brake is provided for use with a caster of the type having a wheel mounted to an axle for rotation, which axle is mounted in a yoke. The add-on unidirectional brake comprises a pair of mounting brackets which are adapted to be mounted to the opposite sides of the caster by means for cooperating with the axle. A U-shaped bail member is provided which has two legs, each of which is mounted to one of the mounting brackets, and a bight connecting the legs. When the mounting brackets are mounted to the caster and the caster is in its upright position, the legs extend rearwardly from their mounting points to the brackets to the bight, which bight rests in contact with the periphery of the wheel. Stop means are provided so that when the brackets are mounted to the caster and the caster is in its upright position, the stop means cooperates with at least one of the mounting brackets and the yoke to limit movement of the mounting bracket when the wheel is rotated in a rearward direction.

BRIEF DESCRIPTION OF THE DRAWINGS

A more complete understanding of the present invention may be gained by consideration of the accompanying specification along with the drawings, in which like numerals refer to like parts throughout, wherein.

DETAILED DESCRIPTION OF THE INVENTION

Figure 1:
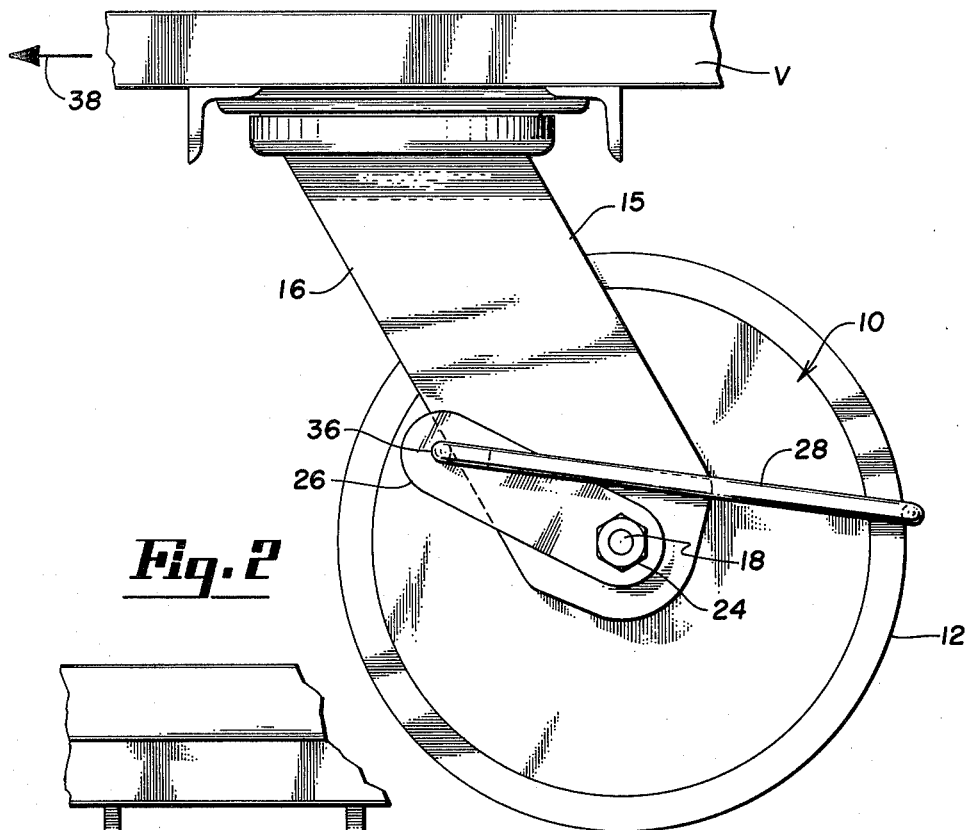
FIG. 1 is a side view of a caster of conventional construction having the unidirectional brake of the present invention mounted thereto.
Figure 2:
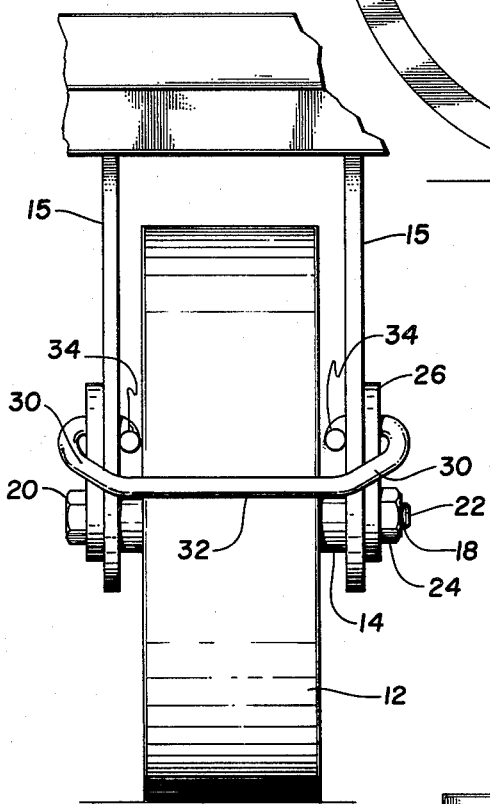
FIG. 2 is a rear view of the caster shown in FIG. 1.

Referring now to FIGS. 1 and 2, a caster 10 of conventional construction has a wheel 12 mounted for rotation to a hub 14 by any suitable means, such as a ball or roller bearing. Hub 14 fits between the arms or sides 15 of a yoke or fork 16 and a bolt 18 extends through hub 14 and cooperating holes in arms 15. Bolt 18 includes a bolt head 20 and a threaded end 22. A nut 24 is screwed onto threaded end 22 of bolt 18 and urges arms 15 of yoke 16 together in order to secure hub 14 and wheel 12 between arms 15 of yoke 16. The axle of wheel 12 comprises hub 14 and bolt 18, so that caster 10 includes a wheel mounted to an axle for rotation, which axle is mounted in a yoke, all in a known, conventional manner.

The caster shown in FIGS. 1 and 2 has the add-on unidirectional brake of the present invention mounted thereto. The unidirectional brake of the present invention includes a pair of mounting brackets 26, each having an aperture therein for accepting bolt 18 therethrough. The apertures in each mounting bracket comprise means for cooperating with the axle to mount mounting brackets 26 to opposite sides of caster 10. A U-shaped bail member 28 includes two legs 30 with a bight 32 connecting legs 30. The ends of legs 30 of bail member 28 terminate in inwardly facing hooks 34 which extend through holes 36 in mounting brackets 26.

In operation, the unidirectional brake of the present invention is mounted to conventional caster 10 by removing nut 24 and withdrawing bolt 18. Mounting brackets 26, with U-shaped bail member 28 in place, are mounted to opposite sides of caster 10 by placing them in position and inserting bolt 18 through the apertures in mounting brackets 26. Nut 24 is then screwed onto threaded portion 22 of bolt 18, so that bolt head 20 and nut 24 comprise means for cooperating with the axle to mount the mounting brackets to the caster. When caster 10 is in its upright position, as shown in FIG. 1, legs 30 extend rearwardly from holes 36 to bight 32, which bight rests in contact with the periphery of wheel 12. When wheel 12 is rotated in a forward direction, that is, its direction of rotation when vehicle V to which caster 10 is mounted is moved in the direction of arrow 38, bail member 28 rides freely on the periphery of wheel 12 and permits free rotation thereof. When wheel 12 is rotated in the reverse direction, the periphery of wheel 12 is frictionally engaged by bight 32 and mounting brackets 26 are pulled rearwardly. Hooks 34 cooperate with arms 15 of yoke 16 to form stop means to limit movement of mounting brackets 26 and bail member 28, and wheel 12 is thereby prevented from rotating. Thus, the unidirectional brake of the present invention permits rotation of wheel 12 in a forward direction, but prevents such rotation in a reverse direction.

It will of course be understood by those skilled in the art that the caster may take forms other than that shown and the add-on unidirectional brake of the present invention may still be used. For example, instead of the bolt having a bolt head, it may have two threaded ends, both of which ends are engaged by nuts to urge arms 15 of yoke 16 together. In this type of conventional caster, mounting brackets 26 can be mounted to the caster either by removing the nuts and placing mounting brackets 26 directly adjacent to arms 15 or by merely providing a wider bight member so that the mounting brackets can be placed over the protruding threaded ends of the bolt and there engaged by other nuts screwed onto the protruding threaded ends. Also, mounting brackets 26 may have slots instead of apertures for cooperating with the axle to permit addition of the brake of the present invention without completely removing the axle bolt. Further, the stop means, while most conveniently formed by hooks 34, may also be prefabricated into the mounting brackets, or only one mounting bracket need have a stop means, all without departing from the spirit of the invention.

Figure 3:
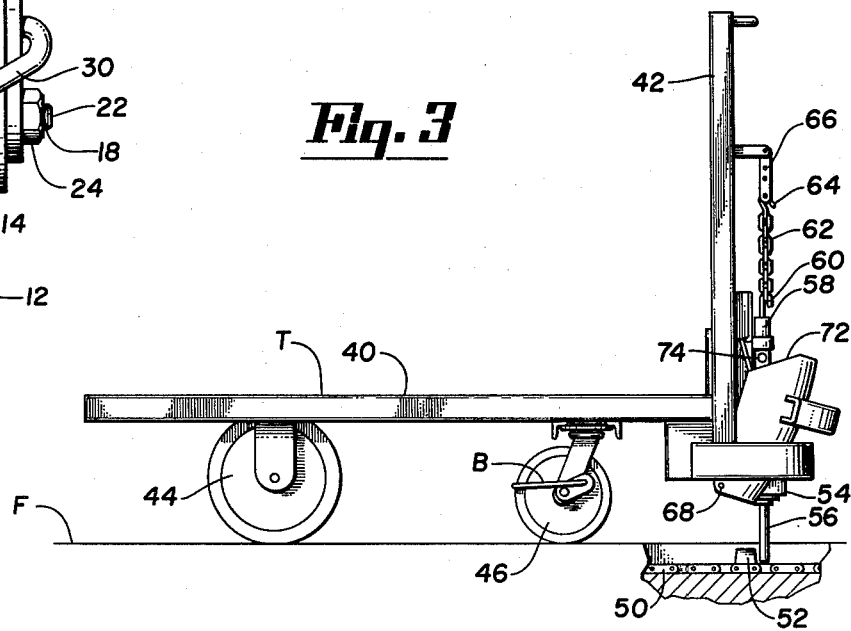
FIG. 3 is a side view of a tow line conveyor truck having the add-on unidirectional brake of the present invention mounted to the front casters thereof.

Referring now to FIG. 3, the add-on unidirectional brake is shown in place for use with a tow line conveyor truck T which comprises part of a tow line conveyor apparatus. Tow line conveyor truck T has a conventional flat truck bed 40 and an upright front member 42. Rear casters 44 are mounted to the truck in a fixed directional orientation and front casters 46 are swivel mounted to the truck at swivel 48.

A sub-floor towing means comprises a tow chain 50, mounted beneath floor F, having engaging means 52 located at spaced intervals thereon. Truck T includes a tow pin housing 54 secured to truck T. A tow pin 56 is mounted for vertical movement within tow pin housing 54, the downward movement of tow pin 56 being limited by cap 58 secured to tow pin 56 and adapted to rest on the top of tow pin housing 54. A first hook 60 is swivel mounted in cap 58 and a tow pin lifting chain 62 is hooked at one end over first hook 60 and at the other end is secured to a cross arm 64 of manually operable swinging bracket 66 pivotally mounted to upright front member 42. Upward swinging of bracket 66 lifts tow pin 56 completely out of the conveyor slot, i.e., slightly above the floor level F.

Secured to the front of truck T for movement about pivot 68 is a rotatable accumulating bumper 70. Bumper 70 has an inclined top surface 72 which cooperates with a pin 74 on tow pin 56 to lift tow pin 56 above engaging means 52, but not completely out of the conveyor slot, when the front bumper engages an obstacle.

The foregoing truck is conventional and is known in the art, the rotatable bumper 70 being merely representative of means for automatically moving tow pin 56 vertically when an obstacle is met in the path of forward movement of truck T in order to disengage tow pin 56 from the engaging means 52.

The unidirectional brake of the present invention is easily added onto the front casters of truck T, as discussed above in connection with caster 10, and FIG. 3 shows such a brake B in position on front casters 46. The add-on unidirectional brake of the present invention has particular usefulness with respect to such a tow line conveyor apparatus since it prevents truck T from rolling rearwardly in situations in which the truck meets an obstacle, thus disengaging tow pin 56 from the subfloor towing means.

In operation, tow pin 56 occupies a first position, shown in FIG. 3, in which it is engaged by engaging means 52. Truck T is thereby pulled forwardly and the unidirectional brake of the present invention is inoperative. When the truck meets an obstacle to its forward movement, bumper 70 is rotated rearwardly about pivot 68, and inclined surface 72 cooperates with pin 74 to raise tow pin 56 to an intermediate position in which tow pin 56 is free of engaging means 54 but is maintained in the slot in the floor. In such a condition, truck T will not roll rearwardly because of the ad-on unidirectional brake of the present invention and the fact that the tow pin 56 is maintained in the slot, thus restraining the front end of truck T from lateral movement. It is seen that if tow pin 56 were free of the slot in floor F, a small lateral force applied to the front of the truck would cause the front end to move laterally, thereby obviating the advantage of using the unidirectional brake B on such a swiveled front caster.

The truck may also be used without reference to the sub-floor towing means merely by raising tow pin 56 free of the slot on the floor. This is accomplished manually by swinging bracket 66 upwardly. This elevates tow pin 56, since tow pin 56 moves vertically with respect to tow pin housing 54, and disengages tow pin 56 from the slot. The truck may then be moved manually in the conventional manner, without restraint by the conveyor slot.

It will be recognized by those skilled in the art that the means for restraining lateral movement of the truck need not take the form of tow pin 56 being maintained within the slot in the floor in order to come within the spirit of the present invention and that any suitable means for restraining lateral movement of the front of truck T may be employed.

Thus, the present invention is capable of use with a conventional, existing caster to form a unidirectional brake, without necessitating replacement of the entire caster or performing extensive modifications to it. It is also seen that the present invention has particular application in a tow line conveyor apparatus having a tow line conveyor truck with swivel mounted front casters. Persons having existing trucks with conventional casters need not replace the front casters thereof in order to obtain the advantages of having a unidirectional brake on the front casters thereof.

Although several specific embodiments of the present invention have been shown and described, those skilled in the art will perceive further modifications other than those specifically pointed out above which can be made without departing from the spirit of the invention, and it is intended by the appended claims to cover all such modifications as fall within the true spirit and scope of the invention.

We claim:

1. An add-on unidirectional brake for use with a caster of the type having a wheel mounted to an axle for rotation, which axle is mounted in a yoke, the unidirectional brake comprising:

a pair of mounting brackets including means for cooperating with the axle to mount said mounting brackets to opposite sides of the caster;

a U-shaped bail member having two legs, each of which legs is mounted at a mounting point to one of said mounting brackets, and a bight connecting said legs wherein, when said mounting brackets are mounted to the caster and the caster is in its upright position, said legs extend rearwardly from said mounting points to said bight, which bight rests in contact with the periphery of said wheel and rides freely thereon when the wheel is rotated in the forward direction relative to said mounting points; and stop means wherein, when said mounting brackets are mounted to the caster and the caster is in its upright position, said stop means cooperates with at least one of said mounting brackets and the yoke to limit movement of said mounting bracket relative to the yoke when the wheel is rotated in a rearward direction to thereby cause a binding action be said bight on the periphery of the wheel to resist rearward rotation.

2. The add-on unidirectional brake recited in claim 1 wherein said stop means cooperates with both of said mounting brackets and said yoke.

3. The add-on unidirectional brake recited in claim 2 wherein:

said mounting brackets each include a hole;

said legs of said U-shaped bail member each terminate in an inwardly facing hook wherein each of said hooks is disposed in a corresponding one of said holes in said mounting brackets so that a portion of said hooks extend inwardly through said holes; and said stop means comprises said inwardly extending portions of said hooks.

4. The add-on unidirectional brake recited in claim 1 for use with a caster of the type in which the axle includes a bolt extending between the yoke arms, which bolt includes a bolt head at one end and a nut threaded onto the other end to urge the yoke arms together, wherein:

said mounting brackets include an aperture for accepting said bolt therethrough, said means for cooperating with the axle to mount said mounting brackets comprises said aperture in said mounting brackets, wherein one of said mounting brackets is adapted to be mounted to the caster by interposing it between the bolt head and the corresponding yoke arm and the other of said mounting brackets is adapted to be mounted to the caster by interposing it between the nut and the corresponding yoke arm.

* * * * *